United States Patent Office 2,934,483
Patented Apr. 26, 1960

2,934,483

PROCESS OF MAKING FUEL ELEMENTS FOR NEUTRONIC REACTORS AND ARTICLES PRODUCED THEREBY

William A. Bostrom, Bridgeville, Pa., and Raymond B. Roof, Jr., Los Alamos, N. Mex., assignors, by mesne assignments, to the United States of America as represented by the United States Atomic Energy Commission No Drawing. Application February 25, 1958
Serial No. 717,533

9 Claims. (Cl. 204—193.2)

This invention deals with a process of making uranium-containing fuel elements for neutronic reactors, for instance, for reactors of the type described in U.S. Patent No. 2,708,656, granted to Fermi and Szilard on May 17, 1955.

Fuel elements are mostly jacketed or clad with a highly corrosion-resistant material to protect the fuel of the core from reaction with the coolant; however, in spite of this, it is advisable to use a core material of good corrosion-resistance, because the cladding might have defects which escaped inspection, and then it is advantageous if the core material does not react with the water. If reaction with water occurs, a reactor core usually changes its dimensions, and mostly it expands, which causes buckling of the cladding and jamming of the fuel elements. The operation of a reactor having such defective fuel elements is very hazardous.

It was found that a uranium-silicon alloy, which contains about 3.8 percent by weight of silicon and which corresponds to the formula $U_3Si$, has a relatively high corrosion-resistance, for instance, in water of a temperature between 300 and 400° C. It was also discovered that this corrosion resistance of $U_3Si$ was greatly impaired when it was clad in a jacket of zirconium metal or a zirconium-base alloy and that this poorer corrosion resistance was due to the migration of silicon from the core into the cladding; this migration brings about formation of the very brittle compound $ZrSi_2$ in the jacket and of the highly corrosive uranium metal in the core.

Attempts have been made to use a barrier layer between cladding and core to prevent this migration of silicon. Metals, such as niobium, molybdenum and copper, have been tested for this purpose. The clad fuel elements made with such a barrier were tested by drilling a hole through the jacket to simulate a defect and by then immersing them in degassed water of 343° C. It was found that the barriers were not satisfactory and that these fuel elements failed within 0 to 14 days.

It was also found during further investigation that the primary requirement for a satisfactory barrier metal is that its free energy of formation of a silicide be less than that for $U_3Si$, in other words, that the barrier does not form a silicide under the conditions to which it is exposed during manufacture of the fuel element and during use. The barrier material also must not form a low-melting alloy with the jacket material or with the core material and also not form a brittle compound therewith. Furthermore, for obvious reasons, the barrier material should not have too high a neutron-capture cross section; and finally, it also should be a good heat conductor.

It is an object of this invention to provide a fuel element of $U_3Si$ jacketed with a zirconium metal or a zirconium alloy which has a satisfactory corrosion resistance to water of elevated temperature.

It is another object of this invention to provide a fuel element of $U_3Si$ jacketed with a zirconium metal or a zirconium alloy in which the core is protected by a barrier which has and retains good corrosion resistance during exposure to water of elevated temperature.

It is furthermore an object of this invention to provide a fuel element of $U_3Si$ jacketed with a zirconium metal or a zirconium alloy which has a relatively low neutron-capture cross section.

It was found that metals that do not react with silicon and do not form a silicide, such as aluminum-base alloys, beryllium, silver, tin, antimony, gold, thallium and lead, are excellent materials for barriers between the $U_3Si$ core and the zirconium-base-metal jacket. Aluminum alloys containing 5 percent or 12 percent by weight of silicon, and aluminum-copper alloys containing about 6 percent by weight of copper were found especially satisfactory. The aluminum-copper alloy was the preferred barrier material.

The process of this invention thus comprises arranging a sleeve of a silicon-nonreactive metal as a barrier around a core of $U_3Si$, cladding the assembly thus obtained with a jacket of a zirconium-base metal, and bonding the three elements into one integral unit.

As has been mentioned before, $U_3Si$ has good corrosion resistance. However, it was found that carbon impairs this corrosion resistance; it is therefore desirable to keep the carbon content of the $U_3Si$ at a minimum, for instance, by avoiding contact with carbon during casting of the core. It was also discovered that up to 0.2 percent by weight of niobium or copper or molybdenum improves the corrosion resistance of $U_3Si$.

The mechanical and corrosion properties of $U_3Si$ are best when used in cast condition. For casting, the $U_3Si$ material was induction-melted at a temperature of about 1650° C. In order to reduce contamination by carbon, melting was carried out in a beryllia-coated graphite crucible and the molten mass was cast into a ceramic mold. The core of uranium silicide thus obtained was heated or annealed at about 800° C. for approximately one week, whereby the compound was practically completely converted to the epsilon-phase, $U_3Si$.

For the cladding, zirconium metal or zirconium-tin alloys which contained from about 1 to 2.5 percent by weight of tin and from 0 to 0.2 percent of iron, chromium and/or nickel were used satisfactorily. All these materials are to be encompassed hereinafter by the term "zirconium metal." The thickness of the cladding may vary widely, good results having been obtained with a jacket 0.015" thick.

It has been found advantageous to pretreat the cladding prior to assembling it with the barrier and the core by annealing it at from about 950 to 1000° C. in vacuum for a short time, for instance, for 30 minutes. By this heat treatment any oxide on the surface of the cladding is dissolved into the cladding and thus removed from the surface. Wetting of the cladding by the barrier during bonding is considerably improved by this pretreatment.

The thickness of the barrier, too, may vary; a 0.010-inch layer has been preferred in most instances.

It was first attempted to bond the barrier to the core, and to the jacket simultaneously by coextrusion at a temperature of between 870 and 900° C. The results obtained thereby were not satisfactory, because the interface formed and the core were highly corrosive; the latter was found to be due to destruction of the epsilon-structure during extrusion. Corrosion tests of the coextruded elements showed that the coextruded units were even more corrosive than the unclad cores. It was also tried to bond the barrier to the core by immersing the latter in molten barrier metal; also this method did not bring about satisfactory results.

It was then decided to effect bonding by brazing. Also here some difficulties were encountered. First a temperature of 850° C. was chosen as the brazing temperature, but it was found to be too low to effect a good bond between the barrier and the cladding, but too high to inhibit interdiffusion between barrier and core. Furthermore, at this temperature the epsilon-structure of the barrier was destroyed.

A two-step brazing procedure was then chosen which yielded excellent results. The cladding was first bonded to the barrier element by heating the two, after assembling them, to a temperature of about 950° C.; thereafter the temperature of the assembly was lowered to between 750 and 700° C. and brought in contact with the core which had been preheated to the same temperature. In both steps an aluminum-silicon alloy, preferably containing 5 or 12 percent by weight of silicon, was used as the brazing alloy.

All fuel elements were tested by drilling a hole 0.04" in diameter through the cladding to the interface, to simulate defectively canned fuel elements, as described before, and then immersing them in degassed water of between 315 and 343° C.

In the following an example is given which shows the improvement obtained by the process of this invention.

*Example*

Four fuel element cores 4.5" long consisting of $U_3Si$ were clad by the process of this invention, each with a 0.015" thick jacket of a zirconium-base alloy containing 1.4 percent of tin, 0.13 percent of iron, 0.1 percent of chromium and 0.05 percent of nickel. A different barrier was used for each fuel element; niobium, copper, molybdenum, and a binary aluminum alloy containing 6 percent by weight of copper, respectively, were the materials for the barriers. The barrier in each instance had a thickness of 0.015". The brazing alloy was aluminum containing 12 percent by weight of silicon.

The fuel elements produced by the process of this invention had an outer diameter of 0.42" and were 4.5" long. They were then provided with a simulated defect as described above and tested with water of 343° C. as described above. While the three fuel elements having the niobium, copper and molybdenum barriers failed within 0 to 14 days, the fuel element with the aluminum-copper barrier had a life of 65 days.

It will be understood that this invention is not to be limited to the details given herein, but that it may be modified within the scope of the appended claims.

What is claimed is:

1. A process of making fuel elements for neutronic reactors comprising surrounding a core of $U_3Si$ with a barrier selected from the group consisting of aluminum-silicon alloy (5 percent Si), aluminum-silicon alloy (12 percent Si), aluminum-copper alloy (6 percent Cu), beryllium, silver, tin, antimony, gold, thallium and lead, placing a jacket of zirconium metal around said barrier, and integrally bonding the assembly thus obtained.

2. The process of claim 1 wherein the barrier metal is an aluminum-copper alloy containing 6 percent by weight of copper.

3. The process of claim 2 wherein the cladding is made of metallic zirconium.

4. The process of claim 2 wherein the cladding is made of a zirconium alloy consisting of from 1.0 to 2.5 percent by weight of tin and from 0 to 0.2 percent by weight of at least one of the metals iron, chromium and nickel, the remainder being zirconium.

5. The process of claim 2 wherein the jacket of zirconium metal has been annealed in vacuum at a temperature of between 950 and 1000° C.

6. A fuel element for neutronic reactors having a high corrosion-resistance to water, said fuel element consisting of a core of $U_3Si$, a jacket of zirconium metal and a barrier between said core and said jacket, said core, barrier and jacket being integrally bonded and said barrier consisting of a metal selected from the group consisting of aluminum-silicon alloy (5 percent Si), aluminum-silicon alloy (12 percent Si), aluminum-copper alloy (6 percent Cu), beryllium, silver, tin, antimony, gold, thallium and lead.

7. The fuel element of claim 6 in which the barrier consists of an aluminum-copper alloy in which the copper content is 6 percent by weight.

8. The fuel element of claim 7 in which the jacket consists of zirconium metal.

9. The fuel element of claim 7 in which the jacket is made of a zirconium alloy consisting of from 1 to 2.5 percent by weight of tin, from 0 to 0.2 percent by weight of at least one of the metals iron, chromium and nickel, and the remainder being zirconium.

References Cited in the file of this patent

BMI-69, June 1, 1951.
WAPD-PWR-PMM-601, Losco and Belle, Feb. 1, 1956, in particular pages 4-23; available from OTS, Dept. of Commerce, Washington 25, D.C. @ 40¢.